US011171699B2

(12) United States Patent
Fultz et al.

(10) Patent No.: US 11,171,699 B2
(45) Date of Patent: *Nov. 9, 2021

(54) WIRELESS LIGHTING CONTROL SYSTEM WITH UNIVERSAL DRIVER CONTROL INTERFACE

(71) Applicant: ABL IP HOLDING LLC, Conyers, GA (US)

(72) Inventors: Tyler B. Fultz, Brookhaven, GA (US); James Krafcik, Chesterfield, MO (US)

(73) Assignee: ABL IP HOLDING LLC, Conyers, GA (US)

( * ) Notice: Subject to any disclaimer, the term of this patent is extended or adjusted under 35 U.S.C. 154(b) by 101 days.

This patent is subject to a terminal disclaimer.

(21) Appl. No.: 16/599,664

(22) Filed: Oct. 11, 2019

(65) Prior Publication Data
US 2020/0205254 A1 Jun. 25, 2020

Related U.S. Application Data

(62) Division of application No. 16/228,936, filed on Dec. 21, 2018, now Pat. No. 10,470,279.

(51) Int. Cl.
*G06F 3/0484* (2013.01)
*H05B 45/30* (2020.01)
(Continued)

(52) U.S. Cl.
CPC ............ *H04B 7/06* (2013.01); *G06F 3/0484* (2013.01); *H05B 45/10* (2020.01); *H05B 45/30* (2020.01);
(Continued)

(58) Field of Classification Search
CPC ...... H05B 47/19; H05B 47/105; H05B 47/18; H05B 45/10; H05B 45/325;
(Continued)

(56) References Cited

U.S. PATENT DOCUMENTS 8,214,061 B2 7/2012 Westrick, Jr. et al.
9,041,312 B2 5/2015 Zulim et al.
(Continued)

FOREIGN PATENT DOCUMENTS

WO 2012176097 A1 12/2012

OTHER PUBLICATIONS

Entire prosecution history of U.S. Appl. No. 16/228,936, filed Dec. 21, 2018, titled "Wireless Lighting Control System With Universal Driver Control Interface."

*Primary Examiner* — Borna Alaeddini
(74) *Attorney, Agent, or Firm* — RatnerPrestia

(57) ABSTRACT

A luminaire includes a universal driver control interface to control various types of driver circuits. The luminaire receives, via a voltage divider, an analog voltage feed as a first driver control signal from at least one driver control wire connected to a driver circuit. The luminaire converts, via an analog-to-digital converter, the analog voltage feed into a digital voltage value. The luminaire compares the digital voltage value with a respective range of unique voltage values in a voltage lookup table for each type of driver circuit to determine a respective type of driver circuit protocol. Based on the determined respective driver circuit (Continued)

protocol identifier and a light source control setting, the luminaire outputs a second driver control signal, via the at least one driver control wire, to the driver circuit.

20 Claims, 8 Drawing Sheets

(51) Int. Cl.
    *H05B 45/325*     (2020.01)
    *H05B 47/105*     (2020.01)
    *H04B 7/06*     (2006.01)
    *H05B 47/19*     (2020.01)
    *H05B 45/10*     (2020.01)
    *H05B 47/18*     (2020.01)
    *H05B 45/3725*     (2020.01)
    *H05B 45/12*     (2020.01)

(52) U.S. Cl.
    CPC ............. *H05B 47/18* (2020.01); *H05B 47/19* (2020.01); *H05B 45/12* (2020.01); *H05B 45/325* (2020.01); *H05B 45/3725* (2020.01); *H05B 47/105* (2020.01)

(58) Field of Classification Search
    CPC .... H05B 45/3725; H05B 45/30; H05B 45/12; H04B 7/06; G06F 3/0484
    See application file for complete search history.

(56) References Cited

U.S. PATENT DOCUMENTS

| | | | |
|---|---|---|---|
| 9,288,293 B2 | 3/2016 | Ryan et al. | |
| 9,374,015 B2* | 6/2016 | Siessegger | H05B 47/19 |
| 9,401,588 B2 | 7/2016 | Zulim et al. | |
| 9,418,115 B2 | 8/2016 | Ganick et al. | |
| 9,538,614 B2 | 1/2017 | Dhingra | |
| 9,547,319 B2 | 1/2017 | Zulim et al. | |
| 9,814,111 B1 | 11/2017 | Huang et al. | |
| 10,129,945 B2 | 11/2018 | Coombes et al. | |
| 10,321,542 B1* | 6/2019 | Lu | H04B 17/318 |
| 10,334,707 B1* | 6/2019 | Lu | H05B 47/11 |
| 2010/0102747 A1 | 4/2010 | Ilyes et al. | |
| 2013/0147351 A1* | 6/2013 | Trainor | H05B 45/10 315/86 |
| 2014/0265935 A1* | 9/2014 | Sadwick | H05B 45/18 315/307 |
| 2014/0354178 A1* | 12/2014 | Siessegger | H05B 45/10 315/294 |
| 2016/0057837 A1 | 2/2016 | Brand et al. | |
| 2016/0286628 A1* | 9/2016 | Cho | G08C 17/00 |
| 2017/0231069 A1 | 8/2017 | Winslett et al. | |
| 2019/0335554 A1* | 10/2019 | Hodrinsky | H02M 7/2173 |

* cited by examiner

Voltage Lookup Table 377

| Driver Circuit Protocol Identifier 385A-C | Range of Unique Voltage Values 396A-C |
|---|---|
| LEDCode (UART) 385A | 0.59 to 0.78 V 396A |
| 0-10 V 385B | 1.54 to 1.80 396B |
| DALI 385C | 1.98 to 2.28 396C |

*FIG. 3D*

Driver Circuit Protocol Table 378

| Driver Circuit Protocol Identifier 385A-C | LEDCode (UART) Switch 389A | 0-10 V Switch 389B | DALI Switch 389C |
|---|---|---|---|
| LEDCode (UART) 385A | ON 386A | OFF 386B | OFF 386C |
| 0-10 V 385B | OFF 386A | ON 386B | OFF 386C |
| DALI 385C | OFF 386A | OFF 386B | ON 386C |

*FIG. 3E*

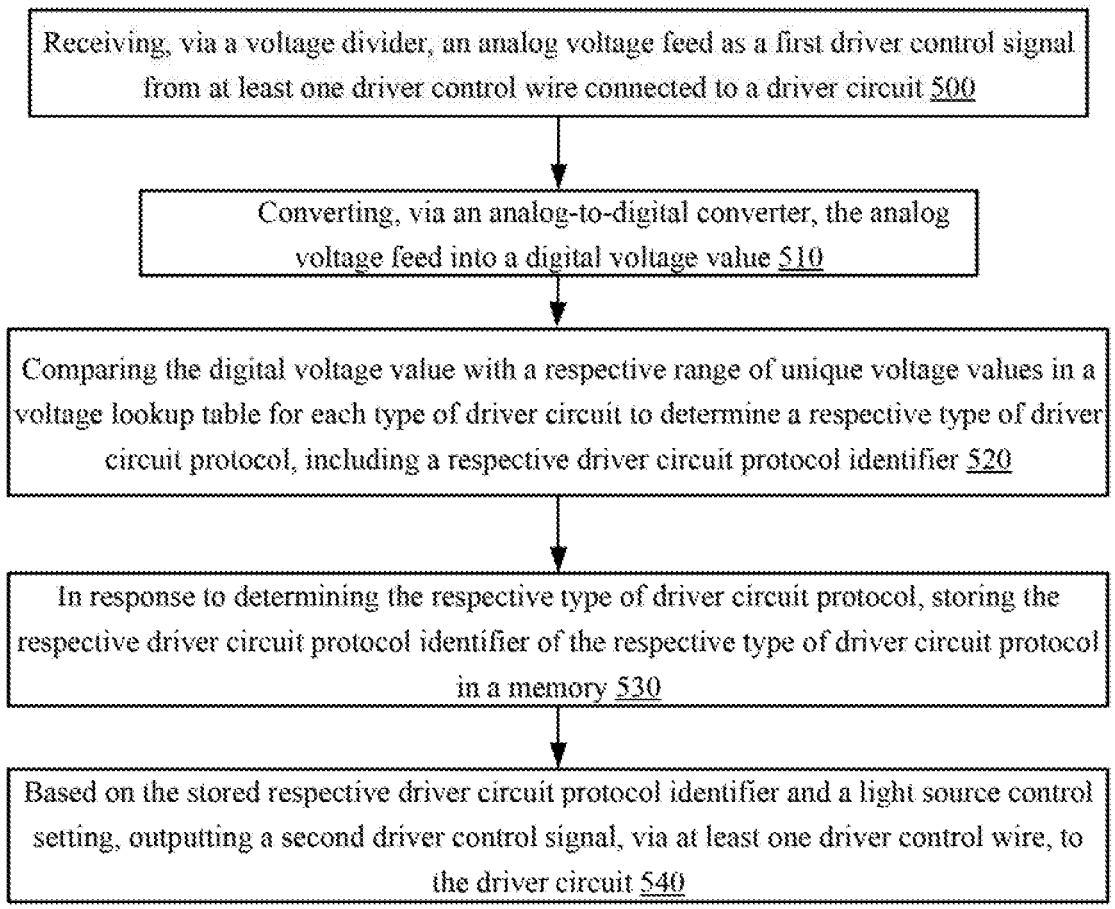

WIRELESS LIGHTING CONTROL SYSTEM WITH UNIVERSAL DRIVER CONTROL INTERFACE

CROSS-REFERENCE TO RELATED APPLICATIONS

This application is a divisional of U.S. patent application Ser. No. 16/228,936, filed Dec. 21, 2018, titled "WIRELESS LIGHTING CONTROL SYSTEM WITH UNIVERSAL DRIVER CONTROL INTERFACE," the entire disclosure of which is incorporated herein by reference.

BACKGROUND

Traditional luminaires can be turned ON and OFF, and in some cases may be dimmed, usually in response to user activation of a relatively simple input device, such as a light switch. Often, traditional luminaires are controlled individually or as relatively small groups at separate locations. Each of the light sources in a luminaires are driven ON and OFF or dimmed by a driver circuit, e.g., for a light emitting diode (LED) light source, or a ballast, e.g. for a fluorescent light source.

Unfortunately, the driver circuit will typically be produced in different variants. In the case of an LED light source, for example, each variant of the driver circuit typically only supports a single lighting control protocol, such as digital addressable lighting interface (DALI), 0-10 Volts (V), digital multiplex signal (DMX), one-wire universal asynchronous receiver/transmitter (UART)—e.g., light emitting diode (LED) code values, etc. When the luminaire does actually support multiple protocols, often users must perform some configuration step to manually switch the luminaire into the desired protocol.

A universal driver control interface is needed to overcome these and other limitations in the art.

SUMMARY

In a first example, a lighting control system includes a plurality of luminaires. Each luminaire includes a light source and a driver circuit coupled to the light source. The driver circuit includes at least one driver control wire. Each luminaire further includes a universal driver control interface coupled to the driver circuit and configured to control light source operation via the driver circuit. The universal driver control interface includes at least one universal driver control interface electrical contact connected to the at least one driver control wire to convey driver control signals between the driver circuit and the universal driver control interface. The at least one universal driver control interface electrical contact is configured to connect to multiple types of driver circuits with different types of driver circuit protocols. Each driver circuit operates in accordance with a respective type of driver circuit protocol. The universal driver control interface further includes a voltage divider connected to the driver circuit via the at least one universal driver control interface electrical contact and an analog-to-digital converter connected to the voltage divider. The universal driver control electrical interface further includes a processor and a memory accessible to the processor. The universal driver control interface further includes a voltage lookup table in the memory including a respective driver circuit protocol identifier for each type of driver circuit and a respective range of unique voltage values for the respective type of driver circuit protocol.

The universal driver control interface further includes universal driver control interface programming in the memory. Execution of the universal driver control interface programming by the processor configures the luminaire to perform the following functions. First, luminaire receives, via the voltage divider, an analog voltage feed as a first driver control signal from the at least one driver control wire. Second, luminaire converts, via the analog-to-digital converter, the analog voltage feed into a digital voltage value. Third, luminaire compares the digital voltage value with the respective range of unique voltage values in the voltage lookup table for each type of driver circuit to determine the respective type of driver circuit protocol, including the respective driver circuit protocol identifier. Fourth, in response to determining the respective type of driver circuit protocol, luminaire stores the respective driver circuit protocol identifier of the respective type of driver circuit protocol in the memory. Fifth, based on the stored respective driver circuit protocol identifier and a light source control setting, luminaire outputs a second driver control signal, via the at least one driver control wire, to the driver circuit.

In a second example, a method includes receiving, via a voltage divider, an analog voltage feed as a first driver control signal from at least one driver control wire connected to a driver circuit. The method further includes converting, via an analog-to-digital converter, the analog voltage feed into a digital voltage value. The method further includes comparing the digital voltage value with a respective range of unique voltage values in a voltage lookup table for each type of driver circuit to determine a respective type of driver circuit protocol, including a respective driver circuit protocol identifier. The method further includes in response to determining the respective type of driver circuit protocol, storing the respective driver circuit protocol identifier of the respective type of driver circuit protocol in a memory. The method further includes based on the stored respective driver circuit protocol identifier and a light source control setting, outputting a second driver control signal, via the at least one driver control wire, to the driver circuit.

BRIEF DESCRIPTION OF THE DRAWINGS

The drawing figures depict one or more implementations in accordance with the present teachings, by way of example only, not by way of limitation. In the figures, like reference numerals refer to the same or similar elements.

FIG. 3D is a voltage lookup table that includes driver circuit protocol identifiers for each type of driver circuit and a range of unique voltage values for a respective type of driver circuit protocol.

FIG. 3E is a driver circuit protocol table that includes driver circuit protocol identifiers for each type of driver circuit and a respective switch setting signal.

FIG. 5 is a flow chart presenting the states and transitions for the luminaires of FIGS. 1-2 as implemented by the universal driver control interface to support various types of driver circuits.

DETAILED DESCRIPTION

Figure 1:
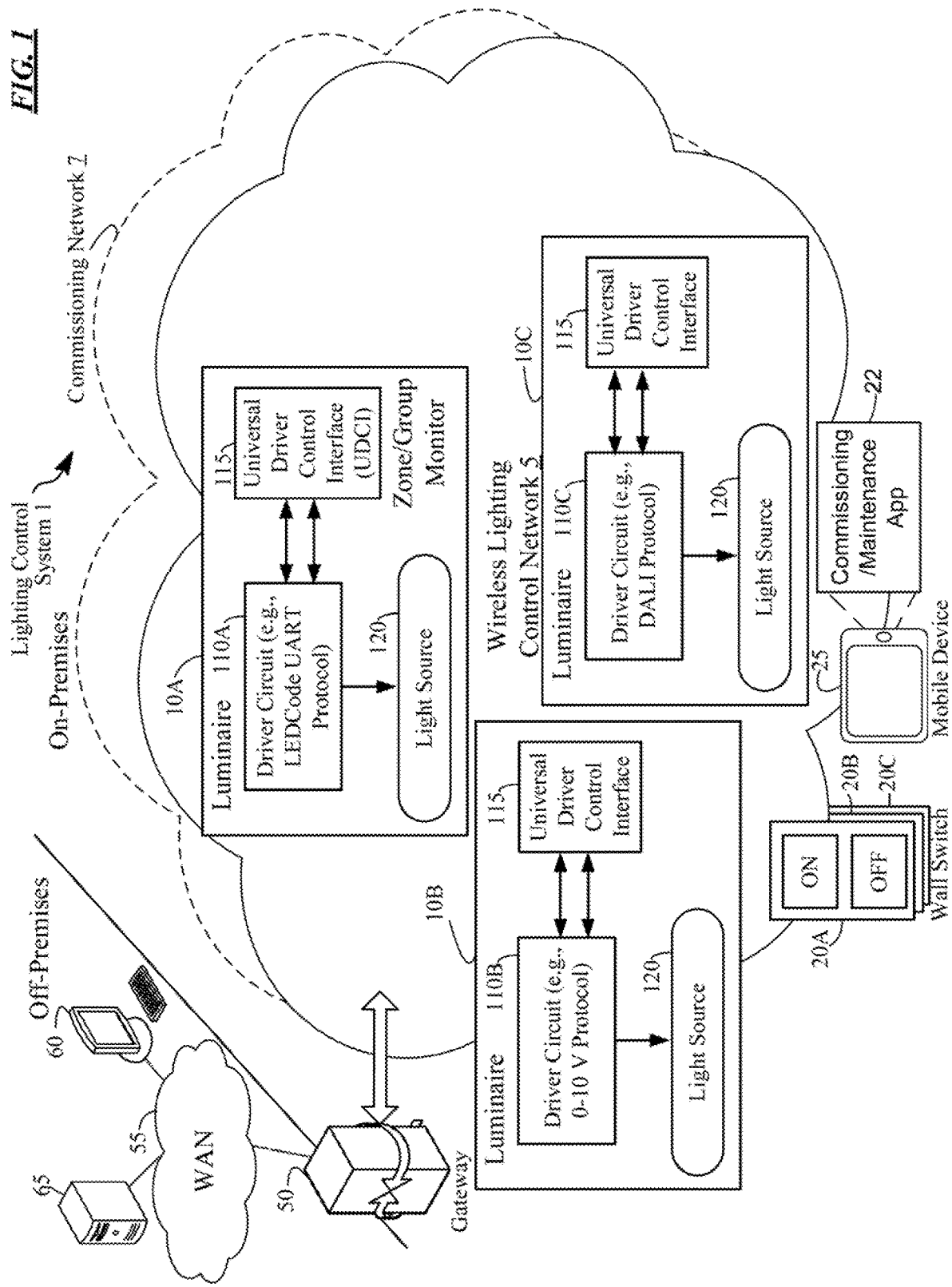
FIG. 1 is a high-level functional block diagram of an example of a lighting control system of networks and devices, including luminaires with various types of driver circuits with different types of driver circuit protocols supported by a universal driver control interface, wall switches, and a mobile device.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

A driver circuit will typically be produced in different variants, with each variant supporting only a single lighting control protocol (e.g. DALI, 0-10V, DMX, LEDcode). In the case when a luminaire does support multiple protocols, often users must perform some configuration step to manually switch the device into the desired driver circuit protocol. Disclosed herein is a universal driver control interface (UDCI) to detect and support multiple driver circuit protocols, which eliminates risk in installation, particularly for retrofitting a luminaire. By automatically determining the appropriate type of driver circuit protocol for a connected driver circuit, the UDCI eliminates the risk of incorrectly wiring and improper configuration of driver circuits connected to a light source of a luminaire.

The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g., of sufficient intensity for general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

Terms such as "artificial lighting" or "illumination lighting" as used herein, are intended to encompass essentially any type of lighting that a device produces light by processing of electrical power to generate the light. A luminaire for an artificial lighting or illumination lighting application, for example, may take the form of a lamp, light fixture, or other luminaire arrangement that incorporates a suitable light source, where the lighting device component or source(s) by itself contains no intelligence or communication capability. The illumination light output of an artificial illumination type luminaire, for example, may have an intensity and/or other characteristic(s) that satisfy an industry acceptable performance standard for a general lighting application.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals Reference now is made in detail to the examples illustrated in the accompanying drawings and discussed below.

Figure 2:
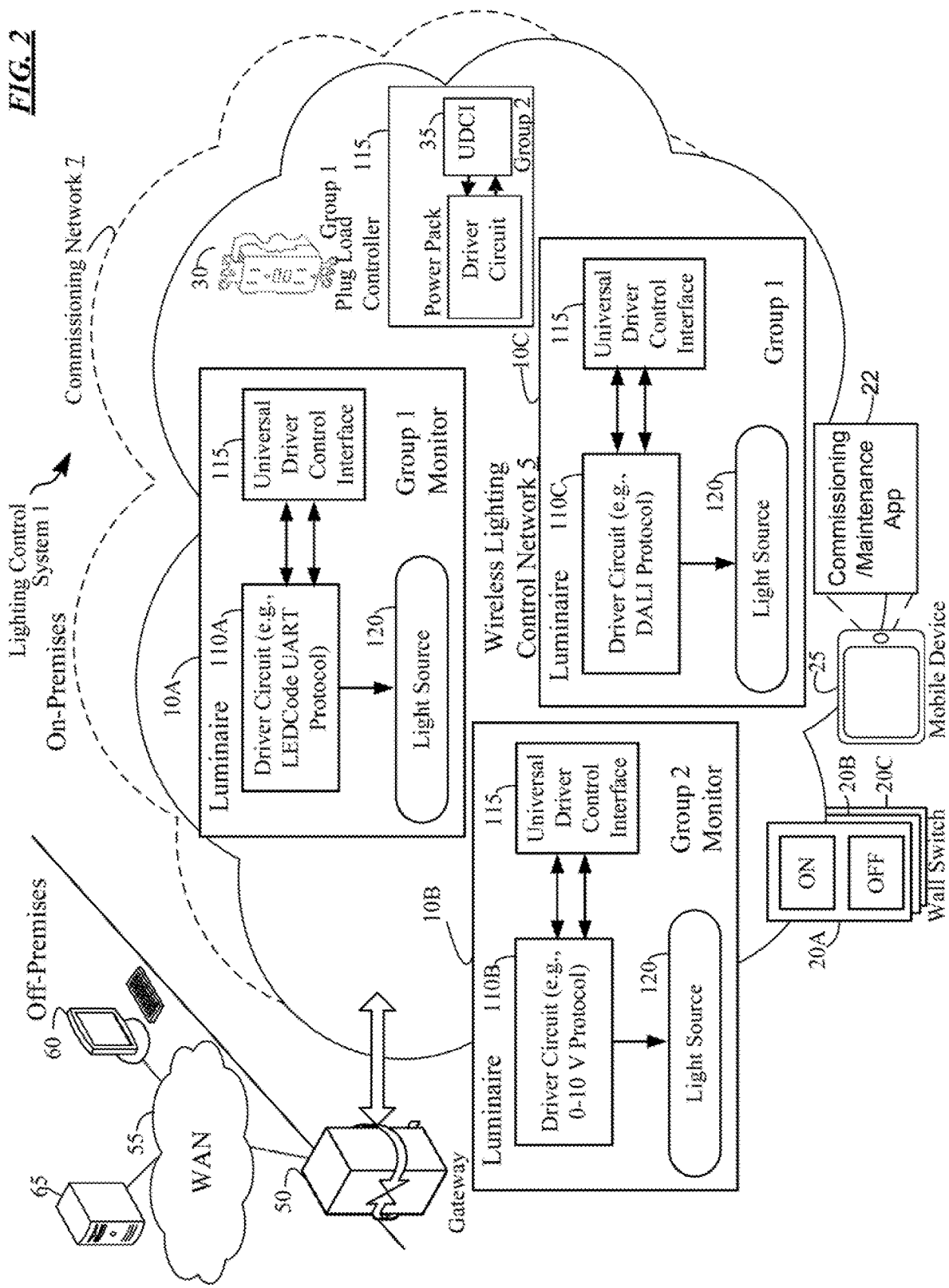
FIG. 2 is another high-level functional block diagram of an example of a lighting control system of networks and devices that further includes a plug load controller and power pack devices and various lighting control groups.

FIG. 1 is a high-level functional block diagram of an example of a lighting control system 1 of networks and devices, including luminaires 10A-C (light fixtures) with various types of driver circuits 110A-C with different types of driver circuit protocols supported by a universal driver control interface 115. Lighting control system 1 further includes a set of wall switches 20A-C for controlling a light source control setting 390 of a light source 120 of the luminaires 10A-C via the wireless lighting control network 5. As used herein, the light source control setting 390 controls the light source 120, including, for example, by turning the light source 120 on/off, dimming up/down, setting a scene (e.g., a predetermined light setting), and can be based on sensor trip events. FIG. 2 is the same as FIG. 1, but further includes a plug load controller 30 and a power pack 35; and illustrates exemplary lighting control groups for controlling the light source control setting 390 of the light source of the luminaire 10A-C via the wireless lighting control network 5.

For purposes of communication and control, each luminaire 10A-C is treated as single addressable device that can be configured to operate as a member of one or more lighting control groups or zones in communication via a wireless lighting control network 5. Detector(s), such as daylight, occupancy, and audio sensors can be embedded in luminaires 10A-C, wall switches 20A-C, plug load controller 30, or power pack 35 to enable controls for occupancy and dimming. Lighting control system 1 may be designed for indoor commercial spaces. Lighting control system 1 further includes a mobile device 25 with a commissioning/maintenance application 22 to commission the luminaires 10A-C, wall switches 20A-C, plug load controller 30, and power pack 35 for transmission and reception of light source control settings 390 via the wireless lighting control network 5.

Light source 120 includes electrical-to-optical transducers include various light emitters, although the emitted light may be in the visible spectrum or in other wavelength ranges. Suitable light generation sources include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used. For example, it should be understood that non-micro versions of the foregoing light generation sources can be used.

A lamp or "light bulb" is an example of a single light source 120. An LED light engine may use a single output for a single source but typically combines light from multiple LED type emitters within the single light engine. Light source 120 can include light emitting diodes (LEDs) that emit red, green, and blue (RGB) light or tunable white light. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output.

As shown, each luminaire 10A-C includes a light source 120 and different types of driver circuits 110A-C coupled to the light source 120. A first luminaire 10A includes a light emitting diode code (LEDCode) driver circuit 110A operating in accordance with LEDCode protocol between 0-5 V, which employs a one-wire universal asynchronous receiver/transmitter (UART) protocol. A second luminaire 10B includes a 0-10 Volt (V) driver circuit 110B operating in accordance with 0-10V dimming protocol, for example, utilizing pulse width modulation (PWM). A third luminaire 10C includes a digital addressable lighting interface (DALI) driver circuit 110C operating in accordance with DALI protocol between 0-24 V. Alternatively, the third luminaire 10C can include a DMX driver circuit 110C.

Driver circuits 110A-C are coupled to the light source 120 and drive that light source 120 by regulating the power to the light source 120, for example, by providing a constant quantity or power (e.g., DC power output) to the light source 120 as its electrical properties change with temperature, for example. Driver circuits 110A-C may be a constant-voltage driver, constant-current driver, or AC LED driver type circuit that provides dimming through a pulse width modulation circuit (PWM) and may have many channels for separate control of light sources 120, including different LEDs or LED arrays. Driver circuits 110A-C can further include an alternating current (AC) or direct current (DC) current source or voltage source, a regulator, an amplifier (such as a linear amplifier or switching amplifier), a buck, boost, or buck/boost converter, or any other similar type of circuit or component. Driver circuits 110A-C can output a variable voltage or current to the light source 120 that may include a DC offset, such that its average value is nonzero, and/or an AC voltage. One example of a commercially available driver circuit 110 is manufactured by EldoLED® and operates in accordance with a LEDCode driver circuit protocol.

As will be described in more detail in FIGS. 3A-E, universal driver control interface (UDCI) 115 is coupled to the driver circuits 110A-C and configured to control light source 120 operation via the respective driver circuits 110A-C. Universal driver control interface 115 is compatible with a wide range of different types of driver circuits 110A-C, including, DALI between 0-24 V, 0-10 V (e.g., pulse width modulation—PWM), one-wire UART communication (e.g., LEDCode), DMX, etc. When the universal driver control interface 115 is connected to the driver circuit 110A-C, the universal driver control interface 115 automatically determines the appropriate driver circuit protocol (e.g., dimming signal) to be used for communication of the light source control setting 390. As explained in further detail in FIGS. 3A-C, when the universal driver control interface 115 is connected to driver control wires 370A-B (e.g., dimming leads) of the driver circuit 110A-C, the voltage between the driver control wires 370A-B is fed across a voltage divider 375 to an analog-to-digital converter (ADC) 376 via an ADC pin of a common input/output interface 390.

Analog-to-digital converter 376 converts an analog input signal (analog voltage feed 383) through a mathematical function into a digital output signal (digital voltage value 384) for processing by the processor 323 of the MCU 330. Analog-to-digital converter 376 can be a direct-conversion ADC, parallel comparator ADC, counter type ADC, servo tracking ADC, successive approximation ADC, integration ADC, delta-encoded ADC, pipelined ADC, etc. Each driver circuit protocol results in a unique digital voltage value 384. By using what is essentially a voltage lookup table 377, a processor 323 (e.g., a microcontroller) determines which type of driver circuit 110A-C is connected and hence the respective driver circuit protocol for communication of the light source control setting. 390. Such a detection method that compares the input voltage with ranges of stored values to determine the appropriate driver circuit protocol, avoids the case where commands may not receive valid responses, which is akin to a trial and error approach. Based on the necessary driver circuit protocol, the processor 323, toggles switches 389A-C to generate and route an appropriate driver control signal 382A-N to the driver control wires 370A-B.

As shown in FIGS. 3A-C and 4, luminaires 10A-C, wall switches 20A-C, plug load controller 30, and power pack 35 communicate control over a 900 MHz (sub-GHz) wireless lighting control network 5 and accordingly each include a first radio transceiver 345 to communicate in the sub-GHz range of a first wireless communication band of the wireless lighting control network 5. A variety of controls are transmitted over wireless lighting control network 5, including, for example, to turn lights on/off, dim up/down, set scene (e.g., a predetermined light setting), and sensor trip events from detector(s). Each luminaire 10A-C, wall switch 20A-C, plug load controller 30, and power pack 35 is also equipped with a second near range Bluetooth Low Energy (BLE) radio transceiver 350 that communicates over wireless commissioning network 7 for purposes commissioning and maintenance the wireless lighting control system 1, however no light source control settings pass over the wireless commissioning network 7. This second transceiver can be a two gigahertz or higher band radio transceiver to communicate in a two GHz or higher range of a second wireless communication band of the wireless commissioning network 7. The respective frequencies of the two different wireless communication bands differ by at least a factor of two (2) (e.g., 900 MHz and 2.4 GHz; 2.4 GHz and 5 GHz; 900 MHz and 5 GHz).

Plug load controller 30 plugs into existing AC wall outlets, for example, and allows existing wired lighting devices, such as table lamps or floor lamps that plug into a wall outlet, to operate in the lighting control system 1. The plug load controller 30 instantiates the table lamp or floor lamp by allowing for commissioning and maintenance operations and processes wireless lighting controls in order to the allow the lighting device to operate in the lighting control system 1. Power pack 35 retrofits with existing wired light fixtures (luminaires 10A-C). The power pack 35 instantiates the wired light fixture by allowing for commissioning and maintenance operations and processes wireless lighting controls in order to allow the lighting device to operate in the lighting control system 1. Both plug load controller 30 and power pack 35 can include the same circuitry, hardware, and software as luminaires 10A-C and wall switches 20A-C.

The lighting control system 1 is provisioned with a mobile device 25 that includes a commissioning/maintenance application 22 for commissioning and maintenance functions of the lighting control system 1. For example, mobile device 25 enables mobile commissioning, configuration, and maintenance functions and can be a PDA or smartphone type of device with human interfacing mechanisms sufficient to perform clear and uncluttered user directed operations. Mobile device 25 runs mobile type applications on iOS7, Android KitKat, and Windows 10 operating systems and commissioning/maintenance application 22 to support commissioning. Web enabled (cloud) services for facilitating commissioning and maintenance activities is also provided by mobile device 25. The commissioning/maintenance application 22 of mobile commissioning device 25 interfaces with the cloud services to acquire installation and configuration information for upload to luminaires 10A-C, wall switches 20A-C, plug load controller 30, and power pack 35. The installation and configuration information is received by mobile device 25 from the gateway 50. The gateway 50 engages in communication through the wide area network (WAN) 55 for example, with various off-premises computing devices 60, 65.

Lighting control system 1 can leverage existing sensor and fixture control capabilities of Acuity Brands Lighting's commercially available nLight® wired product through firmware reuse. In general, Acuity Brands Lighting's nLight® wired product provides the lighting control applications. However, the illustrated lighting control system 1 includes a communications backbone and includes model transport, network, media access control (MAC) physical layer (PHY) functions. The sub-GHz communications of the wireless lighting control network 5 features are built on a near 802.15.4 MAC and PHY implantation with network and transport features architected for special purpose control and air time optimizations to limit chatter. The lighting control system 1 can be deployed in standalone or integrated environments. Lighting control system 1 can be an integrated deployment, or a deployment of standalone groups with no gateway 50. One or more groups of lighting control system 1 may operate independently of one another with no backhaul connections to other networks.

Lighting control system 1 may comprise a mix and match of various indoor systems, wired lighting systems (nLight® wired), emergency, and outdoor (dark to light) products that are networked together to form a collaborative and unified lighting solution. Additional control devices and lighting fixtures, gateway(s) 50 for backhaul connection, time sync control, data collection and management capabilities, and interoperation with the Acuity Brands Lighting's commercially available SensorView® product may also be provided.

As shown in FIG. 2, control, configuration, and maintenance operations of the lighting control system 1 involve networked collaboration between the luminaires 10A-C, wall switches 20A-C, plug load controller(s) 30, and power pack(s) 35 that comprise a lighting control group. An installation is comprised of one or more lighting control groups each operating independently of one another. One or more lighting control groups may exist in the wireless lighting control network 5. Each lighting control group will have a group monitor, and this is shown in FIG. 2 where there a two groups and each group has a monitor.

Groups are formed during commissioning of the lighting control system 1 where all members of the group are connected together over wireless lighting control network 5, which in our example is a sub-GHz subnetwork defined by an RF channel and a lighting control group identifier. The luminaires 10A-C, wall switches 20A-C, plug load controller 30, and power pack 35 subscribe to channels and only listen for/react to messages on the RF channel with the identifier (ID) of the subscribed channel that designates the lighting control group that the luminaire 10A-C, wall switch 20A-C, plug load controller 30, and power pack 35 devices are a member of. For example, the devices subscribe to a multicast group as identified by the lighting control group identifier and only react to messages on the RF channel of the lighting control group. A group can be further divided to address control to specific control zones within the group defined by a control zone identifier. Zone communications are managed as addressable features at run time. Up to 16 independent zones of control are available for each group and each group can support up to 128 addressable elements (luminaires 10A-C, wall switches 20A-C, plug load controller 30, power pack 35).

Further description of the plug load controller 30, the power pack 35, commissioning over the wireless commissioning network 7, and communications of the wireless lighting control network 5 is found in U.S. Pat. No. 9,820,361, issued Nov. 14, 2017, titled "Wireless Lighting Control System," the contents of which is incorporated by reference for all purposes in its entirety as if fully set forth herein.

Figure 3A:
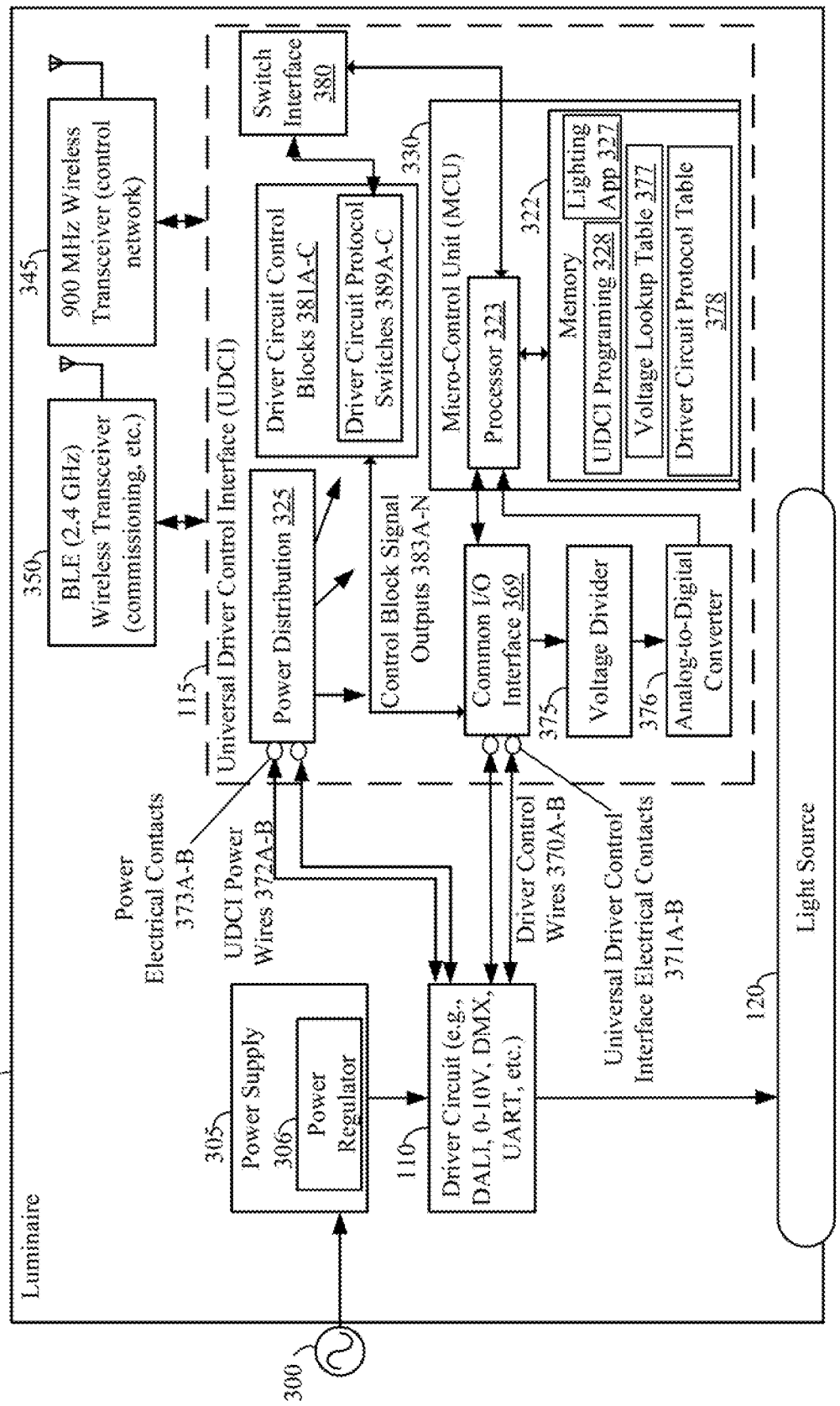
FIGS. 3A-C are block diagrams of a luminaire that communicates via the lighting control system of FIGS. 1-2 and is supported by the universal driver control interface to ensure compatibility with various types of driver circuits.
Figure 3B:
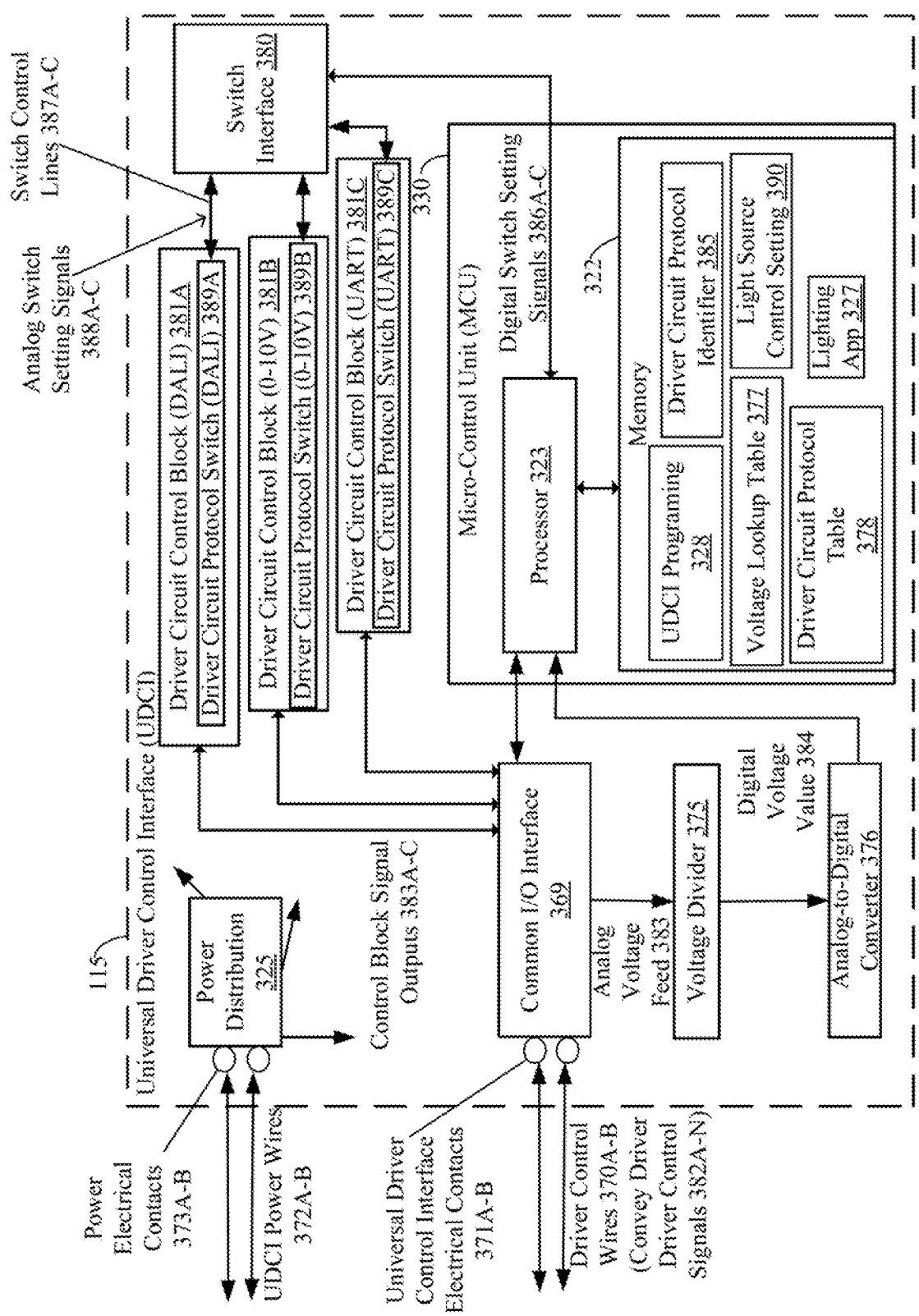
Figure 3C:
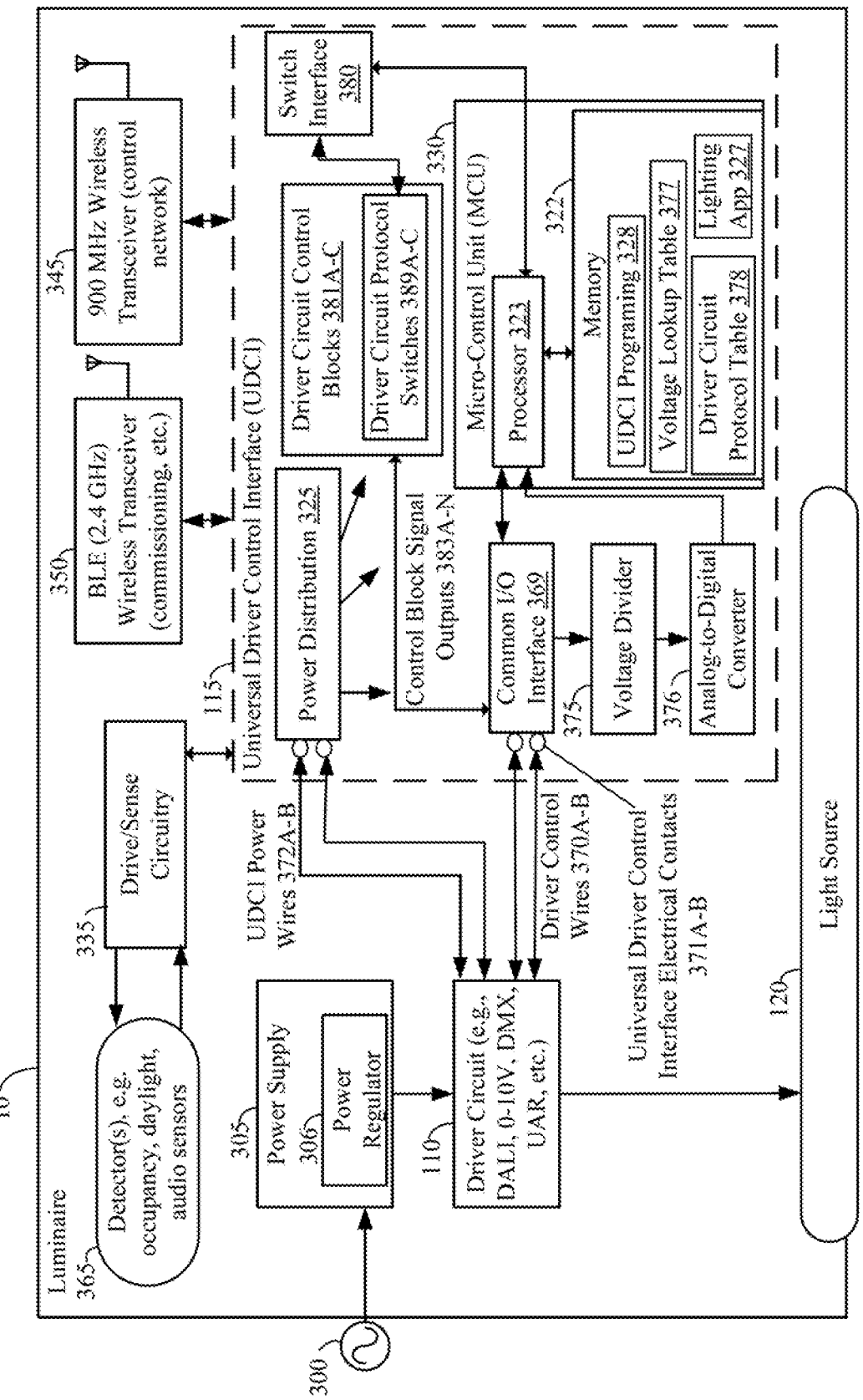

FIGS. 3A-C are block diagrams of a luminaire 10 that communicates via the lighting control system of FIGS. 1-2 and is supported by the universal driver control interface 110 to ensure compatibility with various types of driver circuits 110A-C. Luminaire 10 can be an integrated light fixture that generally includes a power supply 305 driven by a power source 300. Power supply 305 receives power from the power source 300, such as an AC mains, battery, solar panel, or any other AC or DC source. Power supply 305 supplies power and ground voltages to the driver circuit 110, drive/sense circuitry 335, wireless transceivers 345 and 350, and detector(s) 365 to provide reliable operation of the various circuitry of the luminaire 10.

Power supply 305 may include a magnetic transformer, electronic transformer, switching converter, rectifier, or any other similar type of circuit to convert an input power signal into a power signal suitable for luminaire 10. Power supply 305 includes a power regulator 306, which refers to the circuitry within the power supply 305 that stabilizes the output voltage and/or current to be unaffected by changes in the input voltage and loading. In the example, the driver circuit 110 connects to the power supply 305 and the universal driver control interface 115 directly receives DC power from the driver circuit 110 via auxiliary power lines, shown as UDCI power wireless 372A-B. Additionally, luminaire 10 also includes an on-board controller, shown as micro-control unit (MCU) 330. The MCU 330 of luminaire may receive detected sensor settings from on-board integrated detector(s) 365, such as occupancy, audio, or daylight sensors connected via drive/sense circuitry 335, as shown in FIG. 3C. The detected sensor settings are utilized to adjust the light source control setting 390 of a light source 120.

The MCU 330 may be a microchip device that incorporates a processor 323 serving as the programmable central processing unit (CPU) of the MCU 330 as well as one or more memories, represented by memory 322. The memory 322 is accessible to the processor 323, and the memory or memories 322 store executable programming for the CPU formed by processor 323 as well as data for processing by or resulting from processing of the processor 323. The MCU 330 may be thought of as a small computer or computer like device formed on a single chip. Such devices are often used as the configurable control elements embedded in special purpose devices rather than in a computer or other general purpose device. A variety of available MCU chips, for example, may be used as the MCU 330.

The MCU 330 in this example also includes various input and output (I/O) interfaces, shown collectively by way of example as common input/output interface 369. The common I/O interface 369, for example, conveys an analog voltage feed 383 from the driver circuit 110 to the voltage divider 375, which results in a digital voltage value 384 being supplied to the CPU 323 of MCU 330 for processing. The common input/output interface 369 also conveys control block signal outputs 383A-N (e.g., dimming signals) back to the different types of driver circuits 110A-C through the same UDCI electrical contacts 371A-B from which the analog voltage feed 383 was received from the driver circuit 110.

As shown in FIG. 3C, luminaire 10 includes detector(s) 365, such as an in-fixture daylight sensor, an occupancy sensor, an audio sensor, a temperature sensor, or other environmental sensor. Detector(s) 365 may be based on Acuity Brands Lighting's commercially available xPoint® Wireless ES7 product. Drive/sense circuitry 335, such as application firmware, drives the in-fixture occupancy, audio, and photo sensor hardware. Changes to light a source control setting 390 of the light source 120 and communications in the lighting control network occur when drive/sense circuitry 335 of luminaire 10 detects state changes in the detector(s) 365, such as occupancy, daylight, and audio sensors.

As shown, luminaire 10 includes a light source 120 and a driver circuit 110 coupled to the light source 120. The driver circuit 110 includes at least one driver control wire, for example, two driver control wires 370A-B are depicted. Universal driver control interface 115 is coupled to the driver circuit 110 and configured to control light source 120 operation via the driver circuit 110 based on the light source control setting 390.

Universal driver control interface 115 includes at least one universal driver control interface electrical contact (two universal driver control interface electrical contacts 371A-B are depicted, such as ADC pins) connected to the at least one driver control wire 370A-B to convey driver control signals 382A-C between the driver circuit 110 and the universal driver control interface 115. The at least one universal driver control interface electrical contact 371A-B is configured to connect to multiple types of driver circuits 110A-C with different types of driver circuit protocols. Each driver circuit 110A-C operates in accordance with a respective type of driver circuit protocol (e.g., desired dimming signal voltage range).

Luminaire 10 includes a voltage divider 375 connected to the driver circuit 110 via the at least one universal driver control interface electrical contact 371A-B, for example, via a common input/output interface 369. Voltage divider 375 can be a series resistor circuit that may turn a large input voltage, shown as analog voltage feed 383, received from the driver circuit 110 via driver control wires 370A-B, into a smaller output voltage, which can be a fraction of the input voltage. Using just two series resistors and an input voltage, an output voltage that is a fraction of the input voltage can be generated. Luminaire 10 further includes an analog-to-digital converter 376 connected to the voltage divider 375. MCU 330 of the luminaire 100 includes a processor 323, shown as CPU, and a memory 322 (e.g., volatile and non-volatile) accessible to the processor 323. As shown, memory 322 includes a lighting application 327 (which can be firmware) for both lighting control operations and commissioning, maintenance, and diagnostic operations.

MCU 330 includes a voltage lookup table 377 in the memory 322. The voltage lookup table 377 includes a respective driver circuit protocol identifier 385A-C for each type of driver circuit 110A-C and a respective range of unique voltage values 396A-C for the respective type of driver circuit protocol. An example voltage lookup table 377 that includes driver circuit protocol identifiers 385A-C for each type of driver circuit 110A-C and a range of unique voltage values 396A-C for the respective type of driver circuit protocol is shown in FIG. 3D. The voltage lookup table 377 includes a first range of unique voltage values 396A from 0.59 to 0.78 V for the LEDCode (UART) protocol, a second range of unique voltage values 396B from 1.54 to 1.80 V for the 0-10 V dimming protocol, and a third range of unique voltage values 396C from 1.98 to 2.28 V for the DALI protocol. The first range of unique voltage values 396A, the second range of unique voltage values 396B, and the third range of unique voltage values 396C can be non-overlapping.

MCU 330 further includes universal driver control interface programming 328 in the memory 322. Execution of the universal driver control interface programming 328 by the processor 323 configures the luminaire 10 to perform the following functions. First, luminaire 10 receives, via the voltage divider 375, an analog voltage feed 383 as a first driver control signal 382A from the at least one driver control wire 370A-B. Second, luminaire 10 converts, via the analog-to-digital converter 376, the analog voltage feed 383 into a digital voltage value 384. Third, luminaire 10 compares the digital voltage value 384 with the respective range of unique voltage values 396A-C in the voltage lookup table 377 for each type of driver circuit 110A-C to determine the respective type of driver circuit protocol, including the respective driver circuit protocol identifier 385A-C. Fourth, in response to determining the respective type of driver circuit protocol, luminaire 10 stores the respective driver circuit protocol identifier 385 of the respective type of driver circuit protocol in the memory 322. Fifth, based on the stored respective driver circuit protocol identifier 385 and a light source control setting 390, luminaire 10 outputs a second driver control signal 382B, via the at least one driver control wire 370A-B, to the driver circuit 110. The light source control setting 390 controls the light source 120, including, for example, by turning lights on/off, dimming up/down, setting a scene (e.g., a predetermined light setting), and light the source control setting 390 can be based on sensor trip events, such as the detected sensor settings processed by the drive/sense circuitry 335 from the detector(s) 365.

In the example of FIGS. 3A-C, universal driver control interface 115 includes two universal driver control interface electrical contacts 371A-B. The two universal driver control interface electrical contacts 371A-B electrically connect to two driver control wires 370A-B (e.g. dimming leads). The two driver control wires 370A-B are electrically connected to the driver circuit 110. The processor 323 is connected to the analog-to-digital converter 376 to receive the digital voltage value 384 as input. The universal driver control interface 115 includes a respective driver circuit protocol switch 389A-C corresponding to the respective driver circuit protocol. Execution of the universal driver control interface programming 328 by the processor 323 configures the luminaire 10 to perform further functions, including functions to, in response to determining the respective type of driver circuit protocol, toggle the respective driver circuit protocol switch 389A-C corresponding to the respective driver circuit protocol. Execution of the universal driver control interface programming 328 by the processor 323 further configures the luminaire 10 to route the second driver control signal 382B to the driver circuit 110, via the two universal driver control interface electrical contacts 371A-B and the two driver control wires 370A-B.

As shown in FIG. 3B, the universal driver control interface 115 includes multiple driver circuit control blocks 381A-C. Driver circuit control blocks 381A-C match a respective dimming protocol of the connected driver circuit 110A-C. Each driver circuit control block 381A-C includes a respective driver circuit protocol switch 389A-C and a respective switch control line 387A-C connected to the respective driver circuit protocol switch 389A-C. Each driver circuit control block 381A-C further includes a respective control block signal output 383A-C electrically connected to the at least one driver control wire 370A-B (e.g., via common I/O interface 369). Each driver circuit control block 381A-C operates in accordance with the respective type of driver circuit protocol of the respective driver circuit 110A-C and is turned on or off by a respective switch setting signal (e.g., analog switch setting signals 388A-C) applied to the respective switch control line 387A-C. Switch control lines 387A-C toggle driver circuit protocol switches 389A-C on and off based on the stored driver circuit protocol identifier 385.

Universal driver control interface 115 further includes a driver circuit protocol table 378 in the memory 322 that includes the respective driver circuit protocol identifier 385A-C for each type of driver circuit 110A-C and the respective switch setting signal (e.g., digital switch setting signals 386A-C). FIG. 3E shows an example driver circuit protocol table 378 that includes driver circuit protocol identifiers 385A-C for each type of driver circuit 110A-C and the respective digital switch setting signal 386A-C.

Execution of the universal driver control interface programming 328 by the processor 323 configures the luminaire 10 to perform further functions, including functions to, based on the stored respective driver circuit protocol identifier 385, retrieve the respective digital switch setting signal 386A-C from the driver circuit protocol table 378. Luminaire 10 applies the respective analog switch setting signal 388A-C to the respective switch control line 387A-C of the respective driver circuit protocol switch 389A-C. In response to the respective driver circuit protocol switch 387A-C being switched on by the analog respective switch setting signal 388A-C, luminaire 10 outputs the respective control block signal output 383A-C as the second driver control signal 382B, via the at least one driver control wire 370A-B, to the driver circuit 110. For example, the switch interface 380 includes a digital-to-analog converter (DAC) to convert the three digital switch setting signals 386A-C into three analog switch setting signals 388A-C.

In the example of FIG. 3B, the universal driver control interface 115 includes a switch interface 380 connected to the processor 323 and each respective driver circuit control block 381A-C via the respective switch control line 387A-C. Switch interface 380 is configured to receive a digital switch setting signal 386A-C as the retrieved switch setting signal. The function of applying the respective switch setting signal to the respective switch control line 387A-C of the respective driver circuit protocol switch 389A-C includes: (i) converting the digital switch setting signal 386A-C to an analog switch setting signal 388A-C to switch the respective driver circuit protocol switch 389A-C of the respective driver circuit control block 381A-C; and (ii) imparting the analog switch setting signal 388A-C to the respective driver circuit protocol switch 389A-C.

Execution of the universal driver control interface programming 328 by the processor 323 configures the luminaire 10 to perform further functions. First, in response to determining the driver circuit protocol and before outputting the second driver control signal 382B, luminaire 10 turns on or off the respective driver circuit protocol switch 389A-C of the respective driver circuit control block 381A-C. Second, luminaire 10 generates the second driver control signal 382B, via the respective driver circuit control block 381A-C, with the respective driver circuit protocol switch 389A-C turned on. Third, luminaire 10 routes, via the at least one control wire 370A-B, the generated second driver control signal 382B to the driver circuit 110.

As noted above, each luminaire 10 further includes the power supply 305 that includes the power regulator 306. Power distribution circuitry 325 distributes power and ground voltages from the driver circuit 110 to the various components of the universal driver control interface 115. As shown in FIG. 3C, the driver circuit 110 is connected to the power regulator 306 to receive power. As shown in FIG. 3B, universal driver control interface 115 includes two power electrical contacts 373A-B (e.g., power pins to receive low voltage DC auxiliary power from the driver circuit 110). The universal driver control interface 115 is connected to the driver circuit 110 via the two power electrical contacts 373A-B to receive power via the driver circuit 110. However, in some examples, universal driver control interface 115 may receive power via an external DC power supply 305 instead of through the driver circuit 100. The first driver control signal 382A is a dimming lead signal fed from the driver circuit 110 to the universal driver control interface 115 via the two universal driver control interface electrical contacts 371A-B connected to two driver control wires 370A-B. The two universal driver control interface electrical contacts 371A-B can be pins disposed on an external surface of the common input/output (I/O) interface 369. The common input/output (I/O) interface 369 conveys driver control signals 382A-N back and forth between the universal driver control interface 115 and the driver circuit 110. The analog voltage feed 383 to the analog-to-digital converter 376 is the dimming lead signal fed from the driver circuit 110 to the common input/output (I/O) interface 369 of the universal driver control interface 115. Analog voltage feed 383 may be reduced to a fraction of the input voltage received from the driver circuit 100 by the voltage divider 375, in some examples.

Execution of the universal driver control interface 328 programming by the processor 323 configures the luminaire 100 to perform further functions. First, in response to being powered on, universal driver control interface 115 automatically enters into a detect mode to determine the respective type of driver circuit protocol. Second, universal driver control interface 115 continuously controls the driver circuit 110 based on the determined driver circuit protocol until power off (power loss) of the universal driver control interface 115. The universal driver control interface 115 is powered from the driver circuit 110 and remains operational as long as power is available. Upon power loss, the universal driver control interface 115 enters the detect mode once again.

Luminaire 10 also includes a dual-band wireless radio communication interface system configured for two way wireless communication. It should be understood that "dual-band" means communications over two separate RF bands (e.g., any combination of sub-GHz, 2.4 GHz, 5 GHz). The communication over the two separate RF bands can occur simultaneously (concurrently); however, it should be understood that the communication over the two separate RF bands may not actually occur simultaneously. In our example, luminaire 10 has a radio set that includes radio 345 for sub-GHz communications and another radio 350 for Bluetooth RF communications. A first transceiver 345, such as a 900 MHz wireless transceiver, issues control operations on the wireless lighting control network 5. This first transceiver 345 is for any-to-many (unicast and multicast) communication, over a first of the two different wireless communication bands, of control and systems operations information (e.g., light source control setting 390 operations), during luminaire operation and during control network operation over the first wireless communication band over the wireless lighting control network 5. Two transport methods ride on the network layer function of the first transceiver 345: unicast and multicast. The first transceiver 345 engages in multicast group communication of a one-to-many or a many-to-many distribution where group communication is addressed to a group simultaneously.

A second transceiver 350, such as a 2.4 GHz BLE (Bluetooth) wireless transceiver carries out commissioning, configuration, maintenance, and diagnostics of the lighting control network 5 by communicating over the wireless commissioning network 7. This second transceiver 350 is for point-to-point communication, over a second of the two different wireless communication bands over the wireless commissioning network 7, of information other than the control and systems operations information, concurrently with at least some communications over the first wireless communication band.

Execution of the universal driver control interface programming 328 by the processor 323 configures the luminaire 10 to perform further functions. First, luminaire 10 receives, via the first transceiver 345, a wireless message for lighting control network 5 operation. The wireless message includes a lighting control event of an occupancy sensor, an audio sensor, a daylight sensor (shown as detector(s) 365) or a switch 10A-C to turn lighting on/off, dim up/down (e.g., dimming command), or set scene. Second, luminaire 10, issue the light source control setting 390 in response to the lighting control event of the wireless message.

MCU 330 includes programming in the memory 322, which configures the processor 323 to control operations of the respective luminaire 10, including the communications over the two different wireless communication bands via the dual-band wireless radio communication interface system 345, 350. The programming in the memory 322 includes a real-time operating system (RTOS) and further includes the lighting application 327 which is firmware/software that engages in communications with the commissioning/maintenance application 22 of mobile device 25 over the wireless commissioning network 7 of FIGS. 1-2. The lighting application 327 programming in the memory 322 also carries out lighting control operations over the lighting control network 5 of FIGS. 1-2. The RTOS supports multiple concurrent processing threads for different simultaneous control or communication operations of the luminaire 10.

Figure 4:
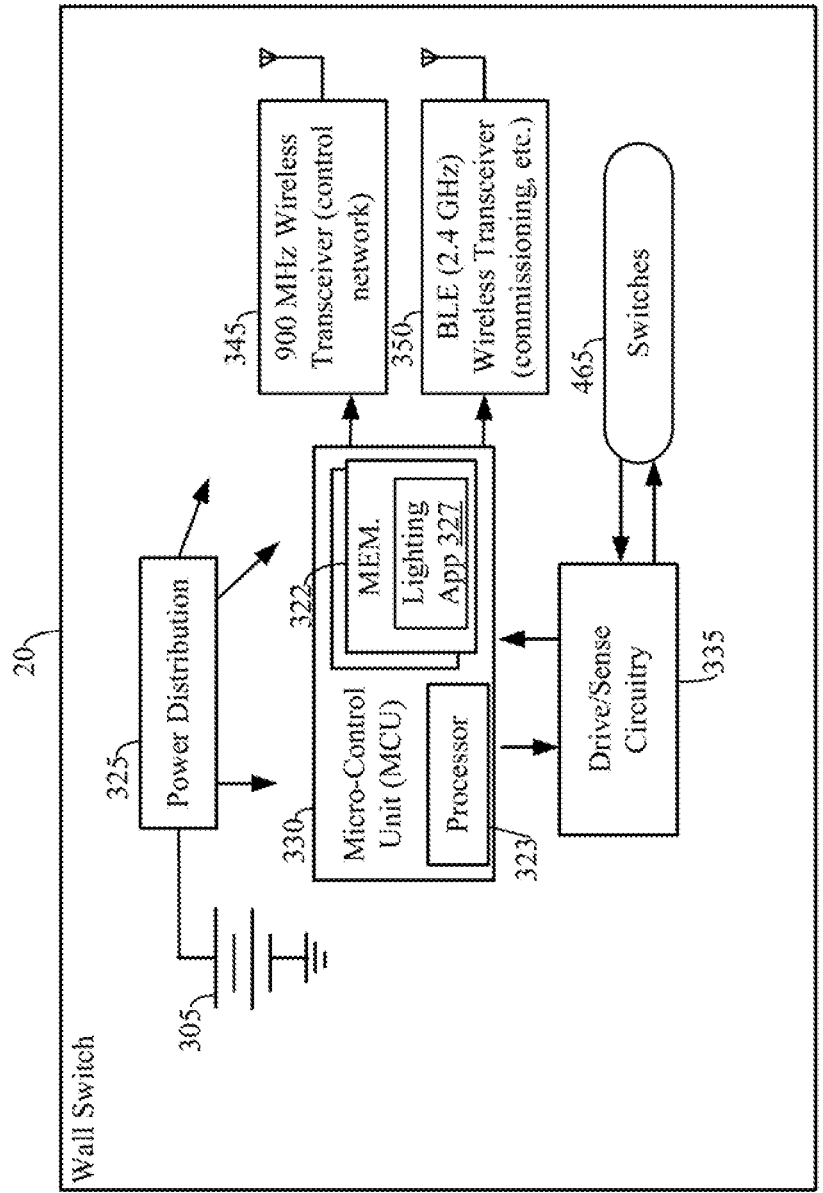
FIG. 4 is a block diagram of a wall switch that communicates via the lighting control system of FIGS. 1-2.

FIG. 4 is a block diagram of a wall switch 20 that communicates via the lighting control system 1 of FIGS. 1-2. The circuitry, hardware, and software of wall switch 20 shown is similar to the luminaire 10 of FIGS. 3A-C. However, wall switch 20 is a controller that can be a battery powered device. Wall switch 20 is similar to luminaire 10 in that they are singularly addressable devices that can be configured to operate as a member of one or more lighting control groups or zones. As shown, wall switch 20 includes a power supply 305, such as a battery or line power, to power itself.

As shown, MCU 330 includes a memory 322 (volatile and non-volatile) and a processor 323. The memory 322 includes a lighting application 327 (which can be firmware) for both lighting control operations and commissioning/maintenance operations. The power distribution circuitry 325 distributes power and ground voltages to the MCU 330, drive/sense circuitry 335, wireless transceivers 345 and 350, and switches 465 to provide reliable operation of the various circuitry on the wall switch 20.

Wall switch 20 also includes a dual-band wireless radio communication interface system configured for two way wireless communication. In our example, wall switch 20 has a radio set that includes radio 345 for sub-GHz communications and another radio 350 for Bluetooth RF communication. A first transceiver 345, such as a 900 MHz wireless transceiver, issues control operations on the lighting control network 5. This first transceiver 445 is for any-to-many (unicast and multicast) communication, over a first of the two different wireless communication bands, of control and systems operations information, during luminaire operation and during control network operation over the first wireless communication band.

A second transceiver 350, such as a 2.4 GHz BLE (Bluetooth) wireless transceiver carries out commissioning, diagnostics, and maintenance of the lighting control network 5 by communicating over the commissioning network 7. This second transceiver 350 is for point-to-point communication, over a second of the two different wireless communication bands, of information other than the control and systems operations information, concurrently with at least some communications over the first wireless communication band.

As shown, the MCU 330 includes programming in the memory 322 which configures the processor 323 to control operations of the respective wall switch 20A-C, including the communications over the two different wireless communication bands via the dual-band wireless radio communication interface system 345, 350. The programming in the memory 322 includes a real-time operating system (RTOS) and further includes a lighting application 327 which is firmware/software that engages in communications with the commissioning/maintenance application 22 of mobile device 25 over the commissioning network 7 of FIGS. 1-2. The lighting application 327 programming in the memory 322 carries out lighting control operations over the lighting control network 5 of FIGS. 1-2. The RTOS supports multiple concurrent processing threads for different simultaneous control or communication operations of the wall switch 20.

FIG. 5 is a flow chart presenting the states and transitions for the luminaires 10A-C of FIGS. 1-2 as implemented by the universal driver control interface 115 to support various types of driver circuits 110A-C. The procedure is initiated in response to the universal driver control interface 115 being powered on. Upon being powered on, universal driver control interface 115 enters automatically into a detect mode to determine the respective type of driver circuit protocol. In response to detecting the respective type of driver circuit protocol, universal driver control interface 115 continuously controls the driver circuit 110 based on the determined driver circuit protocol (e.g., dimming signal protocol) until power off.

Beginning in block 500, the universal driver control interface 115 receives, via a voltage divider 375, an analog voltage feed 383 as a first driver control signal 382A from at least one driver control wire 370A-B connected to a driver circuit 110. Moving to block 510, the universal driver control interface 115 converts, via an analog-to-digital converter 376, the analog voltage feed 383 into a digital voltage value 384. Proceeding to block 520, the universal driver control interface 115 compares the digital voltage value 384 with a respective range of unique voltage values 396A-C in a voltage lookup table 377 for each type of driver circuit 110A-C to determine a respective type of driver circuit protocol, including a respective driver circuit protocol identifier 385A-C. The voltage lookup table 377 includes a first range of unique voltage values 396A for a LEDCode one-wire universal asynchronous receiver/transmitter (UART) protocol, a second range of unique voltage values 396B for a 0-10 V dimming protocol, and a third range of unique voltage values 396C for a DALI protocol between 0-24 V.

Continuing to block 530, in response to determining the respective type of driver circuit protocol, the universal driver control interface 115 stores the respective driver circuit protocol identifier 385 of the respective type of driver circuit protocol in a memory 322.

Further in response to determining the respective type of driver circuit protocol, the universal driver control interface 115 toggles a respective driver circuit protocol switch 389A-C corresponding to the respective driver circuit protocol. Based on the stored respective driver circuit protocol identifier 385, universal driver control interface 115 retrieves a respective switch setting signal 386A-C from a driver circuit protocol table 378. Universal driver control interface 115 applies the respective switch setting signal 386A-C to a respective switch control line 387A-C of a respective driver circuit protocol switch 389A-C of a respective driver circuit control block 381A-C. In response to the respective driver circuit protocol switch 389A-C being switched on by the respective switch setting signal 386A-C, universal driver control interface 115 outputs a respective control block signal output 383A-C of the respective driver circuit control block 381A-C as the second driver control signal 382B, via the at least one driver control wire 370A-B, to the driver circuit 110.

Applying the respective switch setting signal 386A-C to the respective switch control line 387A-C of the respective driver circuit protocol switch 389A-C can include the following steps. First, universal driver control interface 115 converts a digital switch setting signal 386A-C to an analog switch setting signal 388A-C to switch the respective driver circuit protocol switch 389A-C of the respective driver circuit control block 381A-C. Second, universal driver control interface 115 imparts the analog switch setting signal 388A-C to the respective driver circuit protocol switch 389A-C.

For example, in response to determining the driver circuit protocol and before outputting the second driver control signal 382B, universal driver control interface 115 turns on or off a respective driver circuit protocol switch 389A-C of a respective driver circuit control block 381A-C. Universal driver control interface 115 generates the second driver control signal 382B, via the respective driver circuit control block 381A-C, with the respective driver circuit protocol switch 389A-C turned on. Universal driver control interface 115 routes, via the at least one control wire 370A-B, the generated second driver control signal 382B to the driver circuit 110.

Moving to block 540, based on the stored respective driver circuit protocol identifier 385 and a light source control setting 390, the universal driver control interface 115 outputs a second driver control signal 382B, via at least one driver control wire 370A-B, to the driver circuit 110. Universal driver control interface 115 routes the second driver control signal 382B to the driver circuit 110, via two universal driver control interface electrical contacts 371A-B that are electrically connected to two driver control wires 370A-B. Subsequently, the luminaire 10 receives, via a transceiver 345, a wireless message for lighting control network 5 operation. The wireless message includes a lighting control event of a detector(s) 365, such as an occupancy sensor, an audio sensor, a daylight sensor, or a switch 10A-C to turn lighting on/off, dim up/down, or set scene. As a result, the lighting application 327 of the luminaire 10 issues the light source control setting 390 in response to the lighting control event of the wireless message. This light source control setting 390 is then routed by the universal driver control interface 115 to the appropriate driver circuit control block 381-C (e.g., LEDCode UART, 0-10V, DALI, DMX, etc.) to ensure the proper driver control signal 382B is conveyed to the driver circuit 110.

Any of the universal driver control interface functionality described herein for the lighting system elements (e.g., luminaires 10A-C, wall switches 20A-C, plug load controller 30, and power pack 35) of the lighting control system 1 can be embodied in one more applications or firmware as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating systems. In this example, the third party application can invoke API calls provided by the operating system to facilitate functionality described herein.

As used herein, a processor 323 is a hardware circuit having elements structured and arranged to perform one or more processing functions, typically various data processing functions. Although discrete logic components could be used, the examples utilize components forming a programmable central processing unit (CPU). A processor 323 for example includes or is part of one or more integrated circuit (IC) chips incorporating the electronic elements to perform the functions of the CPU.

The applicable processor 323 executes programming or instructions to configure the luminaires 10A-C, wall switches 10A-C, etc. to perform various operations. For example, such operations may include various general operations (e.g., a clock function, recording and logging operational status and/or failure information) as well as various system-specific operations (e.g., universal driver control interface 115) functions. Although a processor 323 may be configured by use of hardwired logic, typical processors in lighting devices or in light responsive devices are general processing circuits configured by execution of programming, e.g., instructions and any associated setting data from the memories 322 shown or from other included storage media and/or received from remote storage media.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A method comprising:
   receiving, via a voltage divider, an analog voltage feed as a first driver control signal from at least one driver control wire connected to a driver circuit;
   converting, via an analog-to-digital converter, the analog voltage feed into a digital voltage value;
   comparing the digital voltage value with a respective range of unique voltage values in a voltage lookup table for each type of driver circuit to determine a respective type of driver circuit protocol, including a respective driver circuit protocol identifier;
   in response to determining the respective type of driver circuit protocol, storing the respective driver circuit protocol identifier of the respective type of driver circuit protocol in a memory; and
   based on the stored respective driver circuit protocol identifier and a light source control setting, outputting a second driver control signal, via the at least one driver control wire, to the driver circuit.

2. The method of claim 1, wherein:
   the voltage lookup table includes a first range of unique voltage values for a one-wire universal asynchronous receiver/transmitter (UART) protocol, a second range of unique voltage values for a 0-10 volt (V) dimming protocol, and a third range of unique voltage values for a digital addressable lighting interface (DALI) protocol.

3. The method of claim 2, wherein:
   the first range of unique voltage values for the one-wire UART protocol is between 0-5 V.

4. The method of claim 1, further comprising:
in response to determining the respective type of driver circuit protocol, toggling a respective driver circuit protocol switch corresponding to the respective driver circuit protocol; and
routing the second driver control signal to the driver circuit, via two universal driver control interface electrical contacts that are electrically connected to two driver control wires.

5. The method of claim 1, further comprising:
based on the stored respective driver circuit protocol identifier, retrieving a respective switch setting signal from a driver circuit protocol table; and
applying the respective switch setting signal to a respective switch control line of a respective driver circuit protocol switch of a respective driver circuit control block.

6. The method of claim 5, further comprising:
in response to the respective driver circuit protocol switch being switched on by the respective switch setting signal, outputting a respective control block signal output of the respective driver circuit control block as the second driver control signal, via the at least one driver control wire, to the driver circuit.

7. The method of claim 6, wherein:
applying the respective switch setting signal to the respective switch control line of the respective driver circuit protocol switch includes:
converting a digital switch setting signal to an analog switch setting signal to switch the respective driver circuit protocol switch of the respective driver circuit control block; and
imparting the analog switch setting signal to the respective driver circuit protocol switch.

8. The method of claim 1, further comprising:
in response to determining the driver circuit protocol and before outputting the second driver control signal:
turning on or off a respective driver circuit protocol switch of a respective driver circuit control block;
generating the second driver control signal, via the respective driver circuit control block, with the respective driver circuit protocol switch turned on; and
routing, via the at least one control wire, the generated second driver control signal to the driver circuit.

9. The method of claim 1, further comprising:
in response to being powered on, entering automatically into a detect mode to determine the respective type of driver circuit protocol; and
continuously controlling the driver circuit based on the determined driver circuit protocol until power off.

10. The method of claim 1, further comprising:
receiving, via a transceiver, a wireless message for lighting control network operation, the wireless message including a lighting control event of an occupancy sensor, an audio sensor, a daylight sensor, or a switch to turn lighting on/off, dim up/down, or set scene; and
issuing the light source control setting in response to the lighting control event of the wireless message.

11. A method comprising:
receiving, via a voltage divider, an analog voltage feed as a first driver control signal from at least one driver control wire connected to a driver circuit;
converting, via an analog-to-digital converter, the analog voltage feed into a digital voltage value;
comparing the digital voltage value with a respective range of unique voltage values in a voltage lookup table for each type of driver circuit to determine a respective type of driver circuit protocol; and
in response to determining the respective type of driver circuit protocol, outputting a second driver control signal, via the at least one driver control wire, to the driver circuit.

12. The method of claim 11, wherein:
the voltage lookup table includes a first range of unique voltage values for a one-wire universal asynchronous receiver/transmitter (UART) protocol, a second range of unique voltage values for a 0-10 volt (V) dimming protocol, and a third range of unique voltage values for a digital addressable lighting interface (DALI) protocol.

13. The method of claim 12, wherein:
the first range of unique voltage values for the one-wire universal asynchronous receiver/transmitter (UART) protocol is between 0-5 V.

14. The method of claim 11, further comprising:
in response to determining the respective type of driver circuit protocol, toggling a respective driver circuit protocol switch corresponding to the respective driver circuit protocol; and
routing the second driver control signal to the driver circuit, via two universal driver control interface electrical contacts that are electrically connected to two driver control wires.

15. The method of claim 11, further comprising:
based on the stored respective type of driver circuit protocol, retrieving a respective switch setting signal from a driver circuit protocol table; and
applying the respective switch setting signal to a respective switch control line of a respective driver circuit protocol switch of a respective driver circuit control block.

16. The method of claim 15, further comprising:
in response to the respective driver circuit protocol switch being switched on by the respective switch setting signal, outputting a respective control block signal output of the respective driver circuit control block as the second driver control signal, via the at least one driver control wire, to the driver circuit.

17. The method of claim 16, wherein:
applying the respective switch setting signal to the respective switch control line of the respective driver circuit protocol switch includes:
converting a digital switch setting signal to an analog switch setting signal to switch the respective driver circuit protocol switch of the respective driver circuit control block; and
imparting the analog switch setting signal to the respective driver circuit protocol switch.

18. The method of claim 11, further comprising:
in response to determining the driver circuit protocol and before outputting the second driver control signal:
turning on or off a respective driver circuit protocol switch of a respective driver circuit control block;
generating the second driver control signal, via the respective driver circuit control block, with the respective driver circuit protocol switch turned on; and
routing, via the at least one control wire, the generated second driver control signal to the driver circuit.

19. The method of claim 11, further comprising:
in response to being powered on, entering automatically into a detect mode to determine the respective type of driver circuit protocol; and continuously controlling the driver circuit based on the determined driver circuit protocol until power off.

20. The method of claim 11, further comprising:

receiving, via a transceiver, a wireless message for lighting control network operation, the wireless message including a lighting control event of an occupancy sensor, an audio sensor, a daylight sensor, or a switch to turn lighting on/off, dim up/down, or set scene; and issuing the light source control setting in response to the lighting control event of the wireless message.

* * * * *